(12) United States Patent
Tanaka et al.

(10) Patent No.: US 9,637,106 B2
(45) Date of Patent: May 2, 2017

(54) POWER-GENERATION CONTROL DEVICE AND POWER-GENERATION CONTROL METHOD FOR HYBRID VEHICLE

(71) Applicant: Mitsubishi Electric Corporation, Tokyo (JP)

(72) Inventors: Hideyuki Tanaka, Tokyo (JP); Masutaka Watanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/601,323

(22) Filed: Jan. 21, 2015

(65) Prior Publication Data
US 2016/0009272 A1    Jan. 14, 2016

(30) Foreign Application Priority Data

Jul. 9, 2014  (JP) .................................. 2014-141149

(51) Int. Cl.
*B60W 10/26*   (2006.01)
*B60W 10/06*   (2006.01)
(Continued)

(52) U.S. Cl.
CPC ............... *B60W 10/06* (2013.01); *B60K 6/48* (2013.01); *B60W 10/08* (2013.01); *B60W 10/26* (2013.01);
(Continued)

(58) Field of Classification Search
CPC .... B60W 20/106; B60W 10/26; B60W 10/06; B60W 10/08; B60W 20/15; B60W 20/13;
(Continued)

(56) References Cited

U.S. PATENT DOCUMENTS

| | | | | |
|---|---|---|---|---|
| 2002/0043945 | A1* | 4/2002 | Omata ................... | B60K 6/485 318/139 |
| 2012/0203417 | A1* | 8/2012 | Matsui ..................... | B60K 6/48 701/22 |

FOREIGN PATENT DOCUMENTS

| | | |
|---|---|---|
| JP | 10-051907 A | 2/1998 |
| JP | 2000-354305 A | 12/2000 |

(Continued)

OTHER PUBLICATIONS

Communication dated Aug. 4, 2015 from the Japanese Patent Office issued in corresponding application No. 2014-141149.

*Primary Examiner* — Yuen Wong
(74) *Attorney, Agent, or Firm* — Sughrue Mion, PLLC; Richard C. Turner

(57) ABSTRACT

Provided is a power-generation control device and a power-generation control method for a hybrid vehicle, which are capable of suppressing a temperature rise of an electric motor while controlling a field-weakening current to flow through the electric motor to protect the electric motor and a battery even when an induced voltage increased by an increase in rpm of the electric motor exceeds an allowable voltage of the battery. Power generation by an electric motor is stopped when a voltage of a battery is equal to or higher than a predetermined first voltage, and an in-vehicle electric load is supplied with power generated by the electric motor and a power-generation amount by the electric motor is controlled so that the voltage of the battery becomes equal to a predetermined second voltage, when the voltage of the battery is lower than the predetermined second voltage.

18 Claims, 4 Drawing Sheets

(51) Int. Cl.
  *B60W 10/08* (2006.01)
  *B60W 20/13* (2016.01)
  *B60K 6/48* (2007.10)
  *B60W 10/30* (2006.01)
  *B60W 30/184* (2012.01)
  *B60W 20/15* (2016.01)

(52) U.S. Cl.
  CPC ............ *B60W 10/30* (2013.01); *B60W 20/13* (2016.01); *B60W 20/15* (2016.01); *B60W 30/1843* (2013.01); *B60K 2006/4825* (2013.01); *B60W 2510/087* (2013.01); *B60W 2510/244* (2013.01); *Y02T 10/6226* (2013.01); *Y02T 10/6286* (2013.01); *Y02T 10/7077* (2013.01); *Y10S 903/903* (2013.01)

(58) Field of Classification Search
  CPC ............ B60W 10/30; B60W 30/1843; B60W 2510/087; B60W 2510/244; Y10S 903/903; Y02T 10/7077; Y02T 10/6226; Y02T 10/26; B60K 6/48; B60K 2006/4825
  See application file for complete search history.

(56) References Cited

FOREIGN PATENT DOCUMENTS

| | | |
|---|---|---|
| JP | 2013-115937 A | 6/2013 |
| JP | 2013-216264 A | 10/2013 |

\* cited by examiner

POWER-GENERATION CONTROL DEVICE AND POWER-GENERATION CONTROL METHOD FOR HYBRID VEHICLE

BACKGROUND OF THE INVENTION

1. Field of the Invention

The present invention relates to a power-generation control device and a power-generation control method for a hybrid vehicle, for controlling an internal combustion engine, an electric motor, a battery, and an in-vehicle electric load which constitute a power-generation system of the hybrid vehicle so that a temperature rise of the electric motor is suppressed.

2. Description of the Related Art

The following hybrid vehicle technology to reduce a fuel consumption amount of an automobile is generally known. Specifically, an electric motor is provided on an output shaft of an internal combustion engine so as to compensate for a low-thermal efficiency portion of the internal combustion engine with a driving force of the electric motor and to recover deceleration energy generated at the time of deceleration of the automobile by the electric motor as regenerative power.

The above-mentioned hybrid vehicle, which is operated by the combination of power of the internal combustion engine and power of the electric motor, additionally requires a battery as compared with a vehicle using only the power of the internal combustion engine. In current general hybrid vehicles, an about 100- to 300-V battery is mounted in order to drive the electric motor. Specifically, a large battery is required to be mounted so as to reduce the fuel consumption amount.

Therefore, in recent years, hybrid vehicles compliant with a 48 V-battery which is smaller than those of conventional hybrid vehicles have been proposed. This proposition is also encouraged by situations in which a 12-V battery mounted in conventional vehicles cannot supply sufficient power to an in-vehicle electric load for an automobile, which requires large power.

However, the electric motor for assisting drive of the internal combustion engine is required to have a high torque. In general, the high-torque electric motor has a large induced voltage constant. Therefore, an induced voltage of the electric motor becomes large when an rpm of the electric motor becomes higher. As a result, there is a problem in that the induced voltage of the electric motor adversely exceeds an allowable voltage of the 48-V battery.

As a technology for reducing the adverse effects of the increase in induced voltage of the electric motor on the battery as described above, there exists a method of suppressing an induced-voltage rise by controlling a field-weakening current to flow through the electric motor (see, for example, Japanese Patent Application Laid-open No. 2000-354305).

However, the related art has the following problem.

Specifically, according to Japanese Patent Application Laid-open No. 2000-354305, in order to protect the battery, the field-weakening current is required to be controlled to flow through the electric motor to suppress the induced-voltage rise. However, there is a fear in that the temperature of the electric motor is disadvantageously increased by the field-weakening current to cause an electric motor failure.

SUMMARY OF THE INVENTION

The present invention has been made to solve the problem described above and therefore has an object to provide a power-generation control device and a power-generation control method for a hybrid vehicle, which are capable of suppressing a temperature rise of an electric motor while controlling a field-weakening current to flow through the electric motor to protect the electric motor and a battery even when an induced voltage increased by an increase in rpm of the electric motor exceeds an allowable voltage of the battery.

According to one embodiment of the present invention, there is provided a power-generation control device for a hybrid vehicle, including: a control section for controlling a power-generation system of the hybrid vehicle, the power-generation system including: an internal combustion engine; an electric motor coupled to an output shaft of the internal combustion engine, which is capable of generating power; a battery for accumulating the power generated by the electric motor; and an in-vehicle electric load to be supplied with the power from the battery; and a battery-state detecting section for detecting a voltage of the battery, in which the control section stops the power generation by the electric motor when the voltage of the battery, which is detected by the battery-state detecting section, is equal to or higher than a predetermined first voltage, and supplies the in-vehicle electric load with the power generated by the electric motor and controls a power-generation amount by the electric motor so that the voltage of the battery becomes equal to a predetermined second voltage, which is lower than the predetermined first voltage, when the voltage of the battery is lower than the predetermined second voltage.

Further, according to one embodiment of the present invention, there is provided a power-generation control method for a hybrid vehicle for use in a power-generation system of the hybrid vehicle, the power-generation system including: an internal combustion engine; an electric motor coupled to the internal combustion engine, which is capable of generating power; a battery for accumulating the power generated by the electric motor; and an in-vehicle electric load to be supplied with the power from the battery, the power-generation control method including: detecting a voltage of the battery; and stopping the power generation by the electric motor when the voltage of the battery is equal to or higher than a predetermined first voltage, and supplying the in-vehicle electric load with the power generated by the electric motor and controlling a power-generation amount by the electric motor so that the voltage of the battery becomes equal to a predetermined second voltage, which is lower than the predetermined first voltage, when the voltage of the battery is lower than the predetermined second voltage.

In the present invention, in order to suppress the temperature rise of the electric motor, the power generation by the electric motor is stopped when the voltage of the battery, which is detected by the battery-state detecting section, is equal to or higher than the predetermined first voltage, and the in-vehicle electric load is supplied with the power generated by the electric motor and a power-generation amount by the electric motor is controlled so that the voltage of the battery becomes equal to the predetermined second voltage, which is lower than the predetermined first voltage, when the voltage of the battery is lower than the predetermined second voltage. As a result, it is possible to provide the power-generation control device and the power-generation control method for a hybrid vehicle, which are capable of suppressing the temperature rise of the electric motor while controlling the field-weakening current to flow through the electric motor to protect the electric motor and the battery even when the induced voltage increased by the increase in rpm of the electric motor exceeds the allowable voltage of the battery.

DETAILED DESCRIPTION OF THE PREFERRED EMBODIMENT

Figure 1:
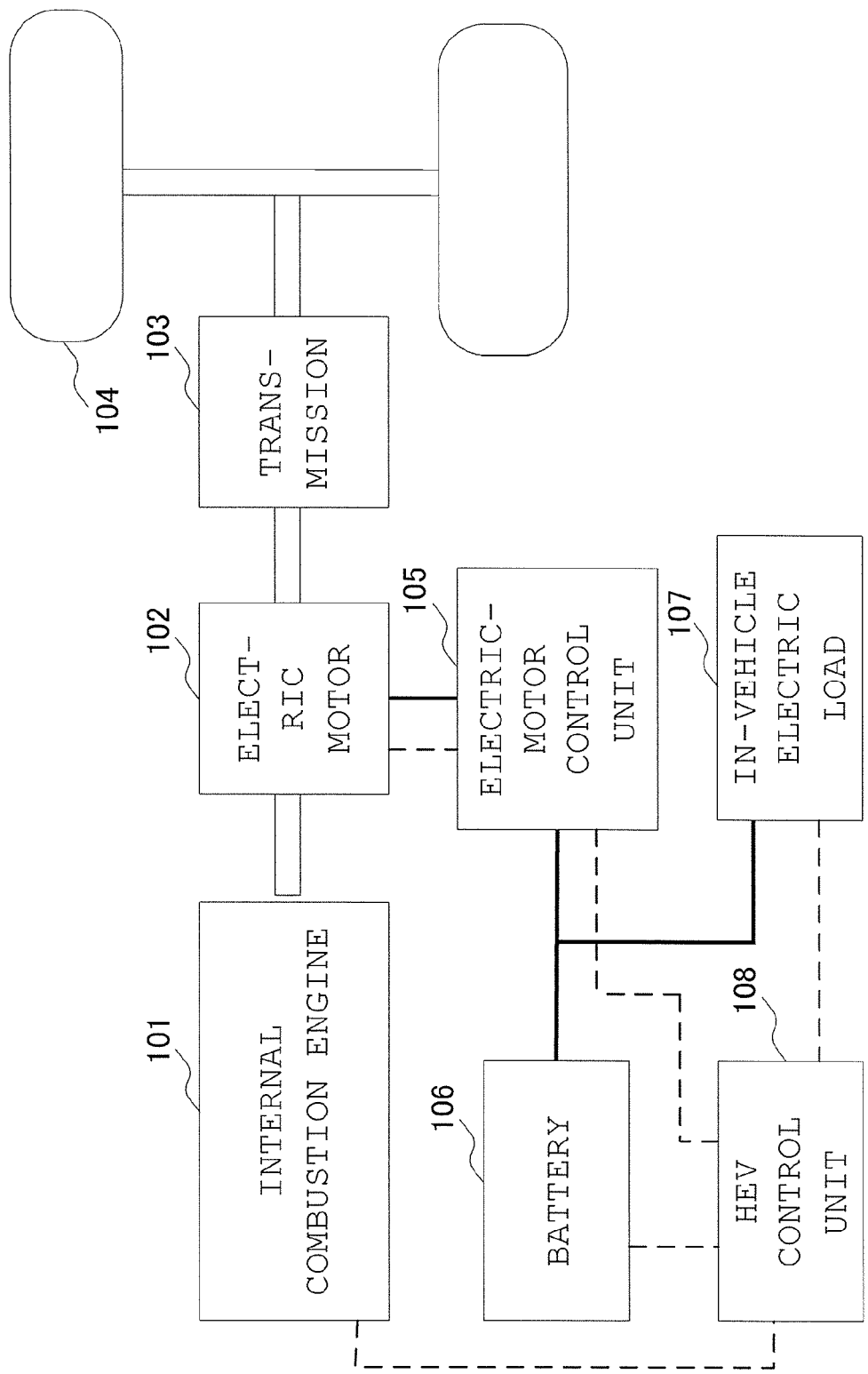
FIG. 1 is an exemplary view of a configuration of a power-generation system of a hybrid vehicle according to a first embodiment of the present invention.

Now, a power-generation control device for a hybrid vehicle and a power-generation control method for a hybrid vehicle according to a preferred embodiment of the present invention is described referring to the accompanying drawings. In the drawings, the same or corresponding parts are denoted by the same reference symbols for description.

First Embodiment

FIG. 1 is an exemplary view of a configuration of a power-generation system of a hybrid vehicle according to a first embodiment of the present invention. The power-generation system of the hybrid vehicle according to the first embodiment includes an internal combustion engine 101, an electric motor 102, a battery 106, and an in-vehicle electric load 107. The electric motor 102 is coupled to the internal combustion engine 101 and is capable of generating electric power. The battery 106 accumulates the electric power generated by the electric motor 102. The in-vehicle electric load 107 is supplied with the electric power from the battery 106.

The internal combustion engine 101 is controlled based on a control signal output from an HEV control unit 108. In this case, the internal combustion engine 101 is, for example, a gasoline engine or a diesel engine, which is capable of generating power for an automobile based on a fossil fuel.

The electric motor 102 is provided on an output shaft of the internal combustion engine 101. The electric motor 102 starts the internal combustion engine 101 and assists drive of the internal combustion engine 101 while the vehicle is running. Moreover, when the vehicle decelerates, the electric motor 102 performs regenerative power generation by a torque transmitted from tires 104 through an intermediation of a transmission 103. After an induced voltage generated by the regenerative power generation is converted into electric power by an electric-motor control unit 105, which is an inverter for controlling the electric motor 102, the electric power obtained by the conversion is supplied to the battery 106 or the in-vehicle electric load 107.

As the in-vehicle electric load 107, there are, for example, a DC-DC converter for supplying electric power from the battery 106 to a 12-V in-vehicle load (not shown) and an electric water pump for supplying cooling water to the internal combustion engine 101. However, the details of the in-vehicle electric load 107 do not closely relate to technical characteristics of the present invention, and therefore the detailed description thereof is herein omitted.

Figure 2:
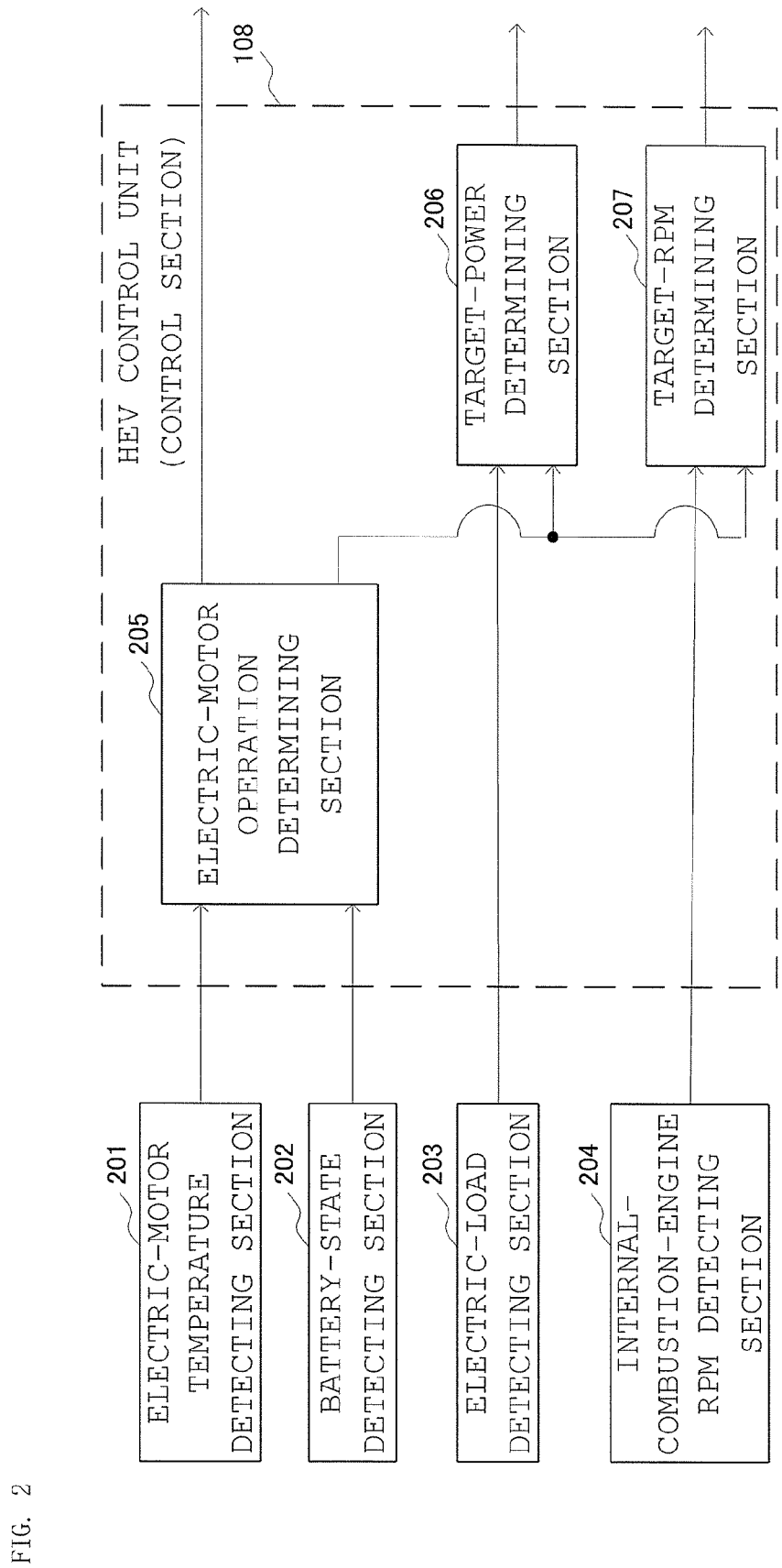
FIG. 2 is a block diagram of a power-generation control device for a hybrid vehicle according to the first embodiment of the present invention.

FIG. 2 is a block diagram of a power-generation control device for a hybrid vehicle according to the first embodiment of the present invention. The power-generation control device for a hybrid vehicle according to the first embodiment of the present invention includes the HEV control unit (control section) 108, an electric-motor temperature detecting section 201, a battery-state detecting section 202, an electric-load detecting section 203, and an internal-combustion-engine rpm detecting section 204.

Moreover, the HEV control unit 108 includes an electric-motor operation determining section 205, a target-power determining section 206, and a target-rpm determining section 207. The target-power determining section 206 and the target-rpm determining section 207 refer to an output from the electric-motor operation determining section 205.

The HEV control unit 108 controls the power-generation system of the hybrid vehicle based on a coil temperature of the electric motor 102, which is detected by the electric-motor temperature detecting section 201, a voltage of the battery 106, which is detected by the battery-state detecting section 202, a load of the in-vehicle electric load 107, which is detected by the electric-load detecting section 203, and an rpm of the internal combustion engine 101, which is detected by the internal-combustion-engine rpm detecting section 204, so that a temperature rise of the electric motor 102 is suppressed.

Figure 3:
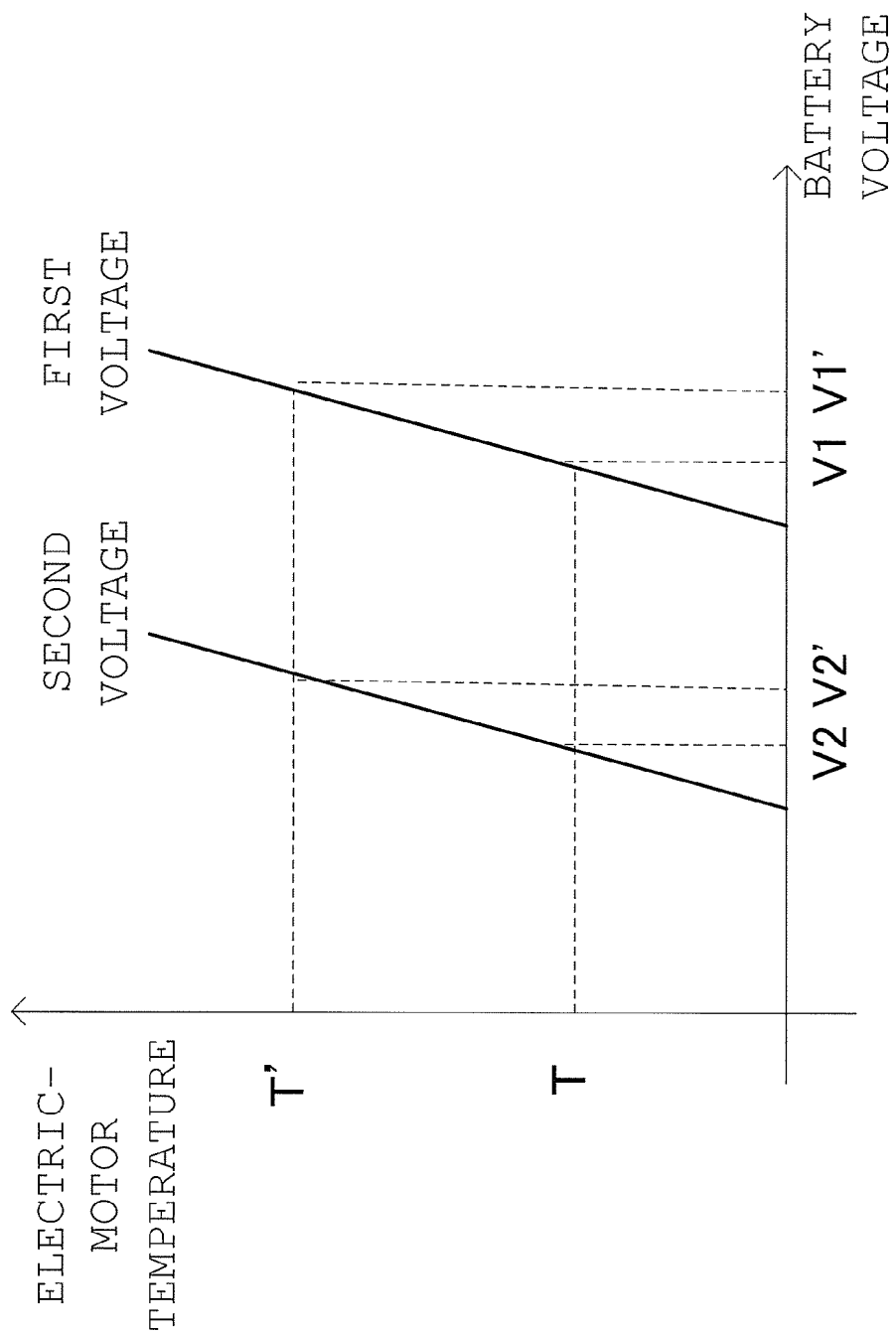
FIG. 3 is an exemplary map which defines a relationship between a temperature of an electric motor of a hybrid vehicle and each of a first voltage and a second voltage according to the first embodiment of the present invention.

FIG. 3 is an exemplary map which defines a relationship between a temperature of the electric motor 102 of the hybrid vehicle and each of a first voltage V1 and a second voltage V2 according to the first embodiment of the present invention.

As shown in FIG. 3, when the voltage of the battery 106 is equal to or higher than the predetermined first voltage V1, the electric-motor operation determining section 205 of the HEV control unit 108 determines that a charge amount of the battery 106 is sufficient and therefore stops the power generation by the electric motor 102. As a result, the electric motor 102 comes into a no-load state where the power is not generated. Thus, a temperature rise of the electric motor 102 is suppressed. Alternatively, fuel efficiency performance can also be improved by reducing a load of the internal combustion engine 101.

On the other hand, when the voltage of the battery 106 is lower than the predetermined second voltage V2, which is lower than the first voltage V1, the electric-motor operation determining section 205 controls a power-generation amount by the electric motor 102 to supply the generated power to the in-vehicle electric load 107. Moreover, the battery 106 is charged so that the voltage of the battery 106 becomes equal to the second voltage V2. In this manner, by intensively charging the battery 106 in a state in which the charge amount of the battery 106 is small, the temperature rise of the electric motor 102 can be suppressed by the combination with a method of limiting power consumption by the in-vehicle electric motor 107 or limiting the rpm of the internal combustion engine 101 as described below.

Specifically, when the temperature of the electric motor 102, which is detected by the electric-motor temperature detecting section 201, is equal to or higher than a predetermined first temperature T1 in the same state as described above in which the voltage of the battery 106 is lower than the predetermined second voltage V2, the target-power determining section 206 of the HEV control unit 108 limits the power consumed by the in-vehicle electric load 107. For example, the power consumed by the in-vehicle electric load 107 is reduced by 50%. However, a specific value thereof depends on a configuration of the hybrid vehicle. As a result, a power-generation load on the electric motor 102 can be reduced to prevent a further increase in temperature of the electric motor 102. It is preferred that the first voltage V1 and the second voltage V2 be respectively set to, for example, 90% and 50% of an allowable voltage of the battery 106. However, characteristics change depending on a vehicle to be realized. Thus, the first voltage V1 and the second voltage V2 are to be adjusted for each vehicle.

In this case, the target-power determining section 206 can also limit the power consumed by the in-vehicle electric load 107 in accordance with a load (such as a current, a voltage, or power) of the in-vehicle electric load 107, which is detected by the electric-load detecting section 203. In this case, for example, the order of priority of stopping the supply of power only needs to be determined in accordance with the degree of effects on running of the vehicle so that the power supply is stopped in ascending order of the priority.

Moreover, when the temperature of the electric motor 102, which is detected by the electric-motor temperature detecting section 201, is equal to or higher than the predetermined first temperature T1 in the same state as that described above where the voltage of the battery 106 is lower than the second voltage V2, the target-rpm determining section 207 of the HEV control unit 108 controls the internal combustion engine 101 so that the rpm of the internal combustion engine 101, which is detected by the internal-combustion-engine rpm detecting section 204, becomes lower than a predetermined rpm (for example, 4,000 rpm; however, a specific value thereof depends on the design of the electric motor).

This is because, as described above, the induced voltage of the electric motor 102 becomes higher in the hybrid vehicle including the electric motor 102 having a large induced voltage constant when the rpm of the electric motor 102 increases, thereby adversely affecting the battery 106. In this manner, by reducing the rpm of the internal combustion engine 101, a field-weakening current for suppressing an increase in induced voltage of the electric motor 102 is reduced so as to prevent the temperature of the electric motor 102 from further increasing.

When the temperature of the electric motor 102 is T' (>T), the HEV control unit 108 refers to the map as shown in FIG. 3, which is presorted in a memory section (not shown), to correct the first voltage V1 and the second voltage V2. Then, when the voltage of the battery 106 becomes equal to a corrected first voltage V1' (>V1), the power generation by the electric motor 102 is stopped. Similarly, when the voltage of the battery 106 becomes equal to a corrected second voltage V2' (>V2), the battery 106 is charged. In this manner, the optimal first voltage V1' and second voltage V2' can be selected in accordance with the temperature of the electric motor 102. Therefore, the battery 106 and the electric motor 102 can be optimally controlled so as to further suppress a temperature rise of the electric motor 102.

Regarding processing in the case where the voltage of the battery 106 is between the first voltage V1 and the second voltage V2, for example, it is preferred that the amount of power generation by the electric motor 102 be increased little by little after the voltage of the battery 106 becomes lower than the first voltage V1 so that the amount of power generation becomes maximum when the voltage of the battery 106 becomes equal to the second voltage V2. However, the amount of power generation by the electric motor 102 greatly relates to operation performance while the vehicle is running. Therefore, the amount of power generation is required to be adjusted for each vehicle.

Moreover, for a boundary of the first voltage V1, hysteresis is provided in the case where the voltage of the battery 106 is lower than the first voltage V1 and the case where the voltage of the battery 106 is higher than the first voltage V1 so as to prevent ON/OFF hunting of a power-generating operation of the electric motor 102. For example, in the case where the temperature of the electric motor 102 is 150° C., when the voltage of the battery 106 becomes larger to turn OFF the power-generating operation of the electric motor 102, the first voltage V1 is set to 50 V. When the voltage of the battery 106 becomes lower to turn ON the power-generating operation of the electric motor 102, the first voltage V1 is set to 48 V. The above-mentioned values are also adjusted for each vehicle because the characteristics change in accordance with the vehicle to be realized.

Figure 4:
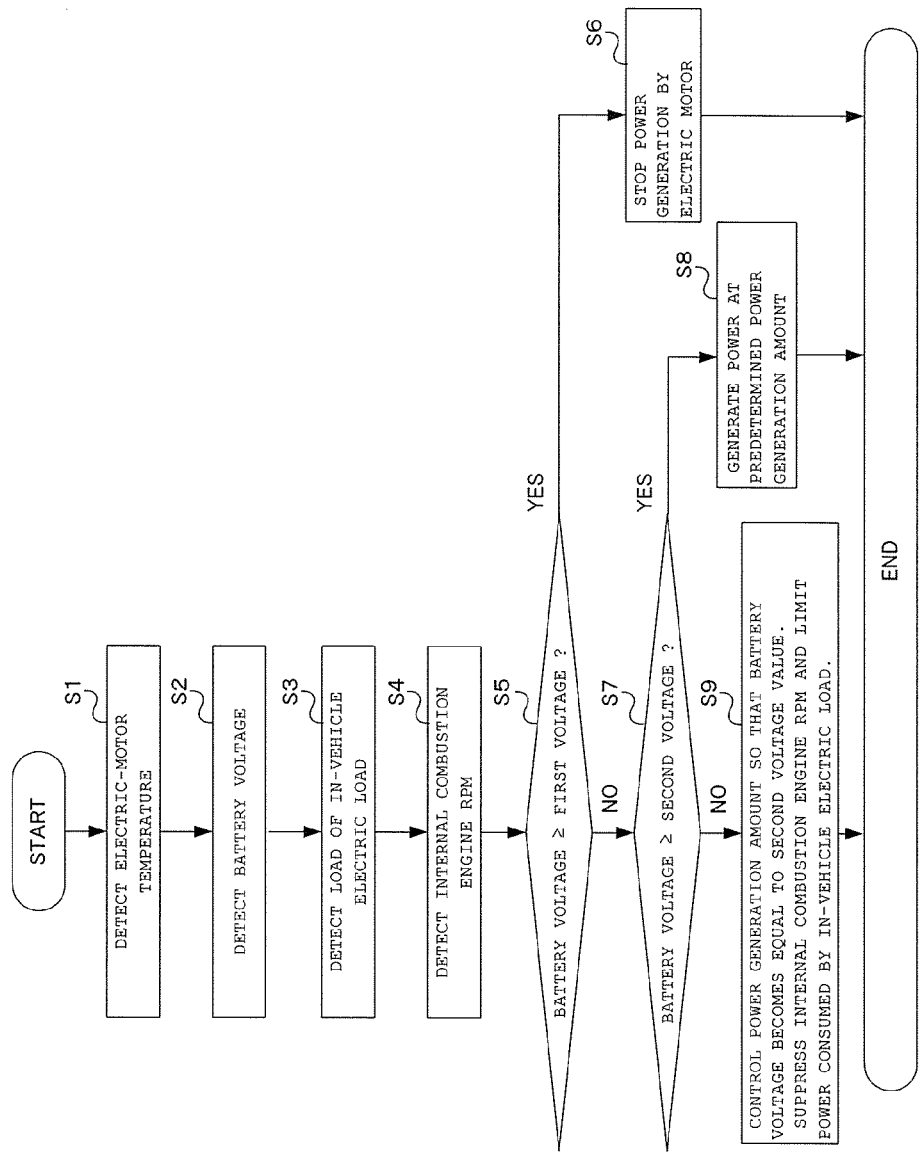
FIG. 4 is a flowchart of a power-generation control method for a hybrid vehicle according to the first embodiment of the present invention.

FIG. 4 is a flowchart of a power-generation control method for a hybrid vehicle according to the first embodiment of the present invention. Now, specific processing of the power-generation control method for a hybrid vehicle is described referring to FIG. 4.

The electric-motor operation determining section 205 stores the temperature of the electric motor 102, which is detected by the electric-motor temperature detecting section 201, in the memory section (not shown) (Step S1). The temperature of the electric motor 102 can be, for example, detected by a thermistor mounted to a coil and can also be estimated from a current flowing through the electric motor 102 or the like.

Next, the electric-motor operation determining section 205 stores the voltage of the battery 106, which is detected by the battery-state detecting section 202, in the memory section (Step S2). The voltage of the battery 106 can be generally obtained from a unit (not shown) for controlling the battery 106 through a vehicle communication line such as a controller area network (CAN).

Next, the target-power determining section 206 stores the load of the in-vehicle electric load 107, which is detected by the electric-load detecting section 203, in the memory section (Step S3). The load of the in-vehicle electric load 107 can be calculated from, for example, output power from the battery 106 and power or regenerative power necessary for the electric motor 102.

Next, the target-rpm determining section 207 stores the rpm of the internal combustion engine 101, which is detected by the internal-combustion-engine rpm detecting section 204, in the memory section (Step S4). The rpm of the internal combustion engine 101 can be obtained from a crank-sensor signal input to the HEV control unit 108 or the like.

Next, the HEV control unit 108 refers to the map shown in FIG. 3, which is stored in advance in the memory section (not shown), to determine the first voltage V1 and the second voltage V2 in accordance with the temperature of the electric motor 102.

The HEV control unit 108 compares the voltage of the battery 106 and the first voltage V1 with each other (Step S5). When the voltage of the battery 106 is equal to or higher than the first voltage V1 (Step S5: YES), the HEV control unit 108 stops the power generation by the electric motor 102 (Step S6).

On the other hand, when the voltage of the battery 106 is lower than the first voltage (Step S5: NO), the HEV control unit 108 compares the voltage of the battery 106 and the second voltage V2 with each other (Step S7).

When the voltage of the battery 106 is equal to or higher than the second voltage V2 (Step S7: YES), the HEV control unit 108 controls the electric motor 102 so as to generate a preset power-generation amount to supply power consumed by the in-vehicle electric load 107. Alternatively, as described above, the electric motor 102 may be controlled so as to continuously change the power-generation amount when the voltage of the battery 106 is between the first voltage V1 and the second voltage V2 (Step S8).

On the other hand, when the voltage of the battery 106 is lower than the second voltage V2 (Step S7: NO), the HEV control unit 108 controls the power-generation amount by the electric motor 102 to supply the generated power to the in-vehicle electric load 107 and charge the battery 106 so that the voltage of the battery 106 becomes equal to the second voltage V2 (Step S9).

When the temperature of the electric motor 102 is equal to or higher than the predetermined first temperature T1, the power consumed by the in-vehicle electric load 107 is limited in accordance with the load of the in-vehicle electric load 107, which is detected by the electric-load detecting section 203. Moreover, the internal combustion engine 101 is controlled so that the rpm of the internal combustion engine 101, which is detected by the internal-combustion-engine rpm detecting section 204, becomes lower than a predetermined rpm (Step S9).

By limiting the rpm of the internal combustion engine 101 as described above, the rpm of the electric motor 102, which is directly coupled to the internal combustion engine 101, can be limited. By reducing the rpm of the electric motor 102, the field-weakening current for suppressing the induced voltage can be reduced. Moreover, the load of the electric-load detecting section 203 is reduced to accelerate charging of the battery 106. As a result, the voltage of the battery 106 can be increased.

As described above, according to the first embodiment, in order to suppress the temperature rise of the electric motor, the power-generation amount by the electric motor is controlled so as to stop the power generation by the electric motor when the voltage of the battery, which is detected by the battery-state detecting section, is equal to or higher than the predetermined first voltage, and to supply the power to the in-vehicle electric load by the power generation by the electric motor so that the voltage of the battery becomes equal to the second voltage when the voltage of the battery is lower than the predetermined second voltage, which is lower than the first voltage. As a result, it is possible to provide the power-generation control device and the power-generation control method for a hybrid vehicle, which are capable of suppressing the temperature rise of the electric motor to protect the electric motor and the battery while controlling the field-weakening current to flow through the electric motor, even when the induced voltage increased with an increase in rpm of the electric motor exceeds the allowable voltage of the battery.

Further, the voltage of the battery is monitored so as to control the power generation by the electric motor in accordance with the map of the first voltage and the second voltage in accordance with the temperature of the electric motor. In this manner, by controlling a large field-weakening current for suppressing the induced voltage of the electric motor to flow when the voltage of the battery drops, the electric motor can be prevented from generating heat to result in a failure.

If there is a possibility that the voltage of the battery 106 does not increase to increase the temperature of the electric motor 102 higher than a second temperature T2, which is a fail temperature, to result in a failure even though the power-generation control as described in the first embodiment is carried out, the electric-motor control unit 105, which is an inverter for controlling the electric motor 102, is set in a short-circuit mode. In this manner, the current generated in the electric motor 102 can be lowered. Further, when the rpm of the internal combustion engine 101 becomes equal to or lower than a given rpm (when a corresponding induced-voltage value becomes equal to or smaller than a given value), it is preferred that the electric-motor control unit 105 be set in an open mode. As described above, by switching the mode of the electric-motor control unit 105 to any one of the short-circuit mode and the open mode in accordance with the voltage of the battery 106 and the rpm of the internal combustion engine 101, a failure of the electric motor 102 can be prevented from occurring.

Further, although the method of limiting the power consumption by the in-vehicle electric load 107, the method of limiting the rpm of the internal combustion engine 101, and the like are described in the first embodiment as the method of suppressing the temperature rise of the electric motor 102, the above-mentioned methods may be used in combination or any one thereof may be carried out. For example, in the case where the stability of the power-generation system of the hybrid vehicle can be maintained by using any one of the above-mentioned methods to suppress the temperature rise of the electric motor 102, the same effects can be obtained with a simpler configuration.

Although not mentioned in the first embodiment, the vehicle is generally equipped with a water-cooling system for cooling the electric motor 102. Therefore, when the temperature of the electric motor 102 is equal to or higher than the second temperature T2 in a state where the voltage of the battery 106 is lower than the second voltage V2, the electric motor 102 is cooled by using the water-cooling system. As a result, the possibility of a failure of the electric motor 102 can be further lowered.

What is claimed is:

1. A power-generation control device for a hybrid vehicle, comprising:
    a central processing unit (CPU) to control a power-generation system of the hybrid vehicle, the power-generation system comprising: an internal combustion engine; an electric motor coupled to an output shaft of the internal combustion engine, which is capable of generating power; a battery to store the power generated by the electric motor; and an in-vehicle electric load to be supplied with the power from the battery; and
    a battery-state detector device to detect a voltage of the battery,
    wherein the CPU stops the power generation by the electric motor when the detected voltage of the battery is greater than or equal to a first reference voltage that corresponds to a first temperature of the electric motor, and
    wherein the CPU supplies the in-vehicle electric load with the power generated by the electric motor and controls a power-generation amount by the electric motor so that the detected voltage of the battery becomes equal to a second reference voltage, which is less than predetermined first reference voltage, when the detected voltage of the battery is less than the second reference voltage that corresponds to a second temperature of the electric motor.

2. The power-generation control device for the hybrid vehicle according to claim 1, further comprising:
an electric-motor temperature detector device to detect a temperature of the electric motor; and
an electric-load detector device to detect a load of the in-vehicle electric load,
wherein the CPU limits power consumed by the in-vehicle electric load in accordance with the detected load of the in-vehicle electric load when the detected temperature of the electric motor is greater than or equal to a predetermined first temperature in a state in which the detected voltage of the battery is less than the second reference voltage.

3. The power-generation control device for the hybrid vehicle according to claim 2, further comprising a water-cooling system for cooling the electric motor,
wherein the CPU cools the electric motor by using the water-cooling system when the detected temperature of the electric motor is greater than or equal to the predetermined first temperature in a state in which the detected voltage of the battery is less than the second reference voltage.

4. The power-generation control device for the hybrid vehicle according to claim 2, further comprising a memory to store a map which defines a relationship between the first temperature of the electric motor and the first reference voltage and a relationship between the second temperature of the electric motor and the second reference voltage,
wherein the first reference voltage and the second reference voltage are determined in accordance with the first temperature and the second temperature of the electric motor by referring to the map.

5. The power-generation control device for the hybrid vehicle according to claim 4, wherein the first reference voltage and the second reference voltage of the map stored in the memory have hysteresis.

6. The power-generation control device for the hybrid vehicle according to claim 2, further comprising an electric-motor controller, which being an inverter for controlling the electric motor,
wherein the CPU switches a mode of the electric-motor controller to one of a short-circuit mode and an open mode in accordance with the detected voltage of the battery and revolutions per minute (rpm) of the internal combustion engine when the detected temperature of the electric motor is greater than or equal to a predetermined second temperature.

7. The power-generation control device for the hybrid vehicle according to claim 1, further comprising:
an electric-motor temperature detector device to detect a temperature of the electric motor; and
an internal-combustion-engine rpm detector device to detect revolutions per minute (rpm) of the internal combustion engine,
wherein the CPU controls the internal combustion engine so that the detected rpm of the internal combustion engine becomes less than a predetermined rpm when the detected temperature of the electric motor is greater than or equal to a predetermined first temperature in a state in which the detected voltage of the battery is less than the second reference voltage.

8. The power-generation control device for the hybrid vehicle according to claim 7, further comprising a water-cooling system for cooling the electric motor,
wherein the CPU cools the electric motor by using the water-cooling system when the detected temperature of the electric motor is greater than or equal to the predetermined first temperature in a state in which the detected voltage of the battery is lower than the second reference voltage.

9. The power-generation control device for the hybrid vehicle according to claim 7, further comprising a memory to store a map which defines a relationship between the first temperature of the electric motor and the first reference voltage and a relationship between the second temperature of the electric motor and the second reference voltage,
wherein the first reference voltage and the second reference voltage are determined in accordance with the first temperature and the second temperature of the electric motor by referring to the map.

10. The power-generation control device for the hybrid vehicle according to claim 9, wherein the first reference voltage and the second reference voltage of the map stored in the memory have hysteresis.

11. The power-generation control device for the hybrid vehicle according to claim 7, further comprising an electric-motor controller, which being an inverter for controlling the electric motor,
wherein the CPU switches a mode of the electric-motor controller to one of a short-circuit mode and an open mode in accordance with the detected voltage of the battery and revolutions per minute (rpm) of the internal combustion engine when the detected temperature of the electric motor is greater than or equal to a predetermined second temperature.

12. The power-generation control device for the hybrid vehicle according to claim 1, further comprising:
an electric-motor temperature detector device to detect a temperature of the electric motor;
an electric-load detector device to detect a load of the in-vehicle electric load; and
an internal-combustion-engine rpm detector device to detect revolutions per minute (rpm) of the internal combustion engine,
wherein the CPU limits power consumed by the in-vehicle electric load in accordance with the detected load of the in-vehicle electric load, and controls the internal combustion engine so that the detected rpm of the internal combustion engine becomes less than a predetermined rpm when the detected temperature of the electric motor is greater than or equal to a predetermined first temperature in a state in which the detected voltage of the battery is less than the second reference voltage.

13. The power-generation control device for the hybrid vehicle according to claim 12, further comprising a water-cooling system for cooling the electric motor,
wherein the CPU cools the electric motor by using the water-cooling system when the detected temperature of the electric motor is greater than or equal to the predetermined first temperature in a state in which the detected voltage of the battery is less than the second reference voltage.

14. The power-generation control device for the hybrid vehicle according to claim 12, further comprising a memory to store a map which defines a relationship between the first temperature of the electric motor and the first reference voltage and a relationship between the second temperature of the electric motor and the second reference voltage,
wherein the first reference voltage and the second reference voltage are determined in accordance with the first temperature and the second temperature of the electric motor by referring to the map.

15. The power-generation control device for the hybrid vehicle according to claim 14, wherein the first reference voltage and the second reference voltage of the map stored in the memory have hysteresis.

16. The power-generation control device for the hybrid vehicle according to claim 12, further comprising an electric-motor controller, which being an inverter for controlling the electric motor, wherein the CPU switches a mode of the electric-motor controller to one of a short-circuit mode and an open mode in accordance with the detected voltage of the battery and revolutions per minute (rpm) of the internal combustion engine when the detected temperature of the electric motor is greater than or equal to a predetermined second temperature.

17. The power-generation control device for the hybrid vehicle according to claim 1, further comprising an electric-motor controller, which being an inverter for controlling the electric motor, wherein the CPU switches a mode of the electric-motor controller to one of a short-circuit mode and an open mode in accordance with the detected voltage of the battery and an rpm of the internal combustion engine when the first or second temperature of the electric motor is greater than or equal to a predetermined second temperature.

18. A power-generation control method for a hybrid vehicle for use in a power-generation system of the hybrid vehicle that includes an internal combustion engine; an electric motor coupled to the internal combustion engine, which is capable of generating power; a battery for accumulating the power generated by the electric motor; an in-vehicle electric load to be supplied with the power from the battery, and a central processing unit (CPU) to control the power-generation system of the hybrid vehicle, the power-generation control method comprising:

detecting, by a battery-state detector device, a voltage of the battery;

stopping, by the CPU, the power generation by the electric motor when the detected voltage of the battery is greater than or equal to a first reference voltage that corresponds to a first temperature of the electric motor; and supplying, by the CPU, the in-vehicle electric load with the power generated by the electric motor and controlling a power-generation amount by the electric motor so that the detected voltage of the battery becomes equal to a second reference voltage, which is less than the first reference voltage, when the detected voltage of the battery is less than the second reference voltage that corresponds to a second temperature of the electric motor.

* * * * *